(12) United States Patent
Weller et al.

(10) Patent No.: US 6,482,452 B1
(45) Date of Patent: Nov. 19, 2002

(54) COMBINED LIQUID-TIGHT MEAT TRAY AND INSERTED ABSORBENT/SEPARATING LAYER

(75) Inventors: Frank Weller, Remscheid (DE); Ralf von Eckern, Wuppertal (DE)

(73) Assignee: Innovative FreshPacking Holding B.V., Cappelle san de Ijssel (NL)

( * ) Notice: Subject to any disclaimer, the term of this patent is extended or adjusted under 35 U.S.C. 154(b) by 0 days.

(21) Appl. No.: 09/831,703
(22) PCT Filed: Nov. 10, 1999
(86) PCT No.: PCT/EP99/08604
§ 371 (c)(1), (2), (4) Date: May 9, 2001
(87) PCT Pub. No.: WO00/27726
PCT Pub. Date: May 18, 2000

(30) Foreign Application Priority Data

Nov. 10, 1998 (DE) .......................... 198 51 778

(51) Int. Cl.⁷ .......................... B65D 85/00; B65D 81/24
(52) U.S. Cl. .......................... 426/129; 426/124; 206/205; 206/204
(58) Field of Search ................. 426/129, 124, 426/126, 127, 392, 106, 133, 331, 332; 206/204, 205

(56) References Cited

U.S. PATENT DOCUMENTS

| | | | | |
|---|---|---|---|---|
| 3,026,209 A | * | 3/1962 | Niblack et al. | |
| 4,061,785 A | * | 12/1977 | Nishino et al. | 426/124 |
| 4,321,997 A | * | 3/1982 | Miller | |
| 4,576,278 A | * | 3/1986 | Laiewski et al. | |
| 4,802,574 A | * | 2/1989 | Akiba | 206/204 |
| 5,705,214 A | * | 1/1998 | Ito et al. | 426/129 X |

FOREIGN PATENT DOCUMENTS

EP 0673856 * 9/1995

OTHER PUBLICATIONS

"Antimicrobial and Preservative Activity of Garlic on Fresh Ground Camel Meat" Al–Delaimy et al, 1971.*
WO 92/18398, Kannankeril, Oct. 1992.*

* cited by examiner

*Primary Examiner*—Reginald L. Alexander
(74) *Attorney, Agent, or Firm*—Gudrun E. Huckett

(57) ABSTRACT

A combination of a liquid-tight meat tray an absorbent/separating layer inserted into the meat tray, wherein the absorbent/separating layer has an absorbent pad and a film arranged on the absorbent pad for reducing the permeability of meat juice released by gravity from a piece of meat placed onto the absorbent/separating layer. The meat tray, the absorbent/separating layer, and the piece of meat placed on the absorbent/separating layer are to be wrapped by a fresh-keeping foil such that a common closed envelope is formed of the fresh-keeping foil. The combination as a zone introduced into a space to be enclosed by the fresh-keeping foil, wherein the zone contains a purely plant-based preservative of crushed spice material having microbially active volatile components employed in a chemically unchanged form. The microbially active volatile components form an aura within the space to be enclosed by the fresh keeping foil without the crushed spice material and the piece of meat having direct contact with one another.

14 Claims, 1 Drawing Sheet

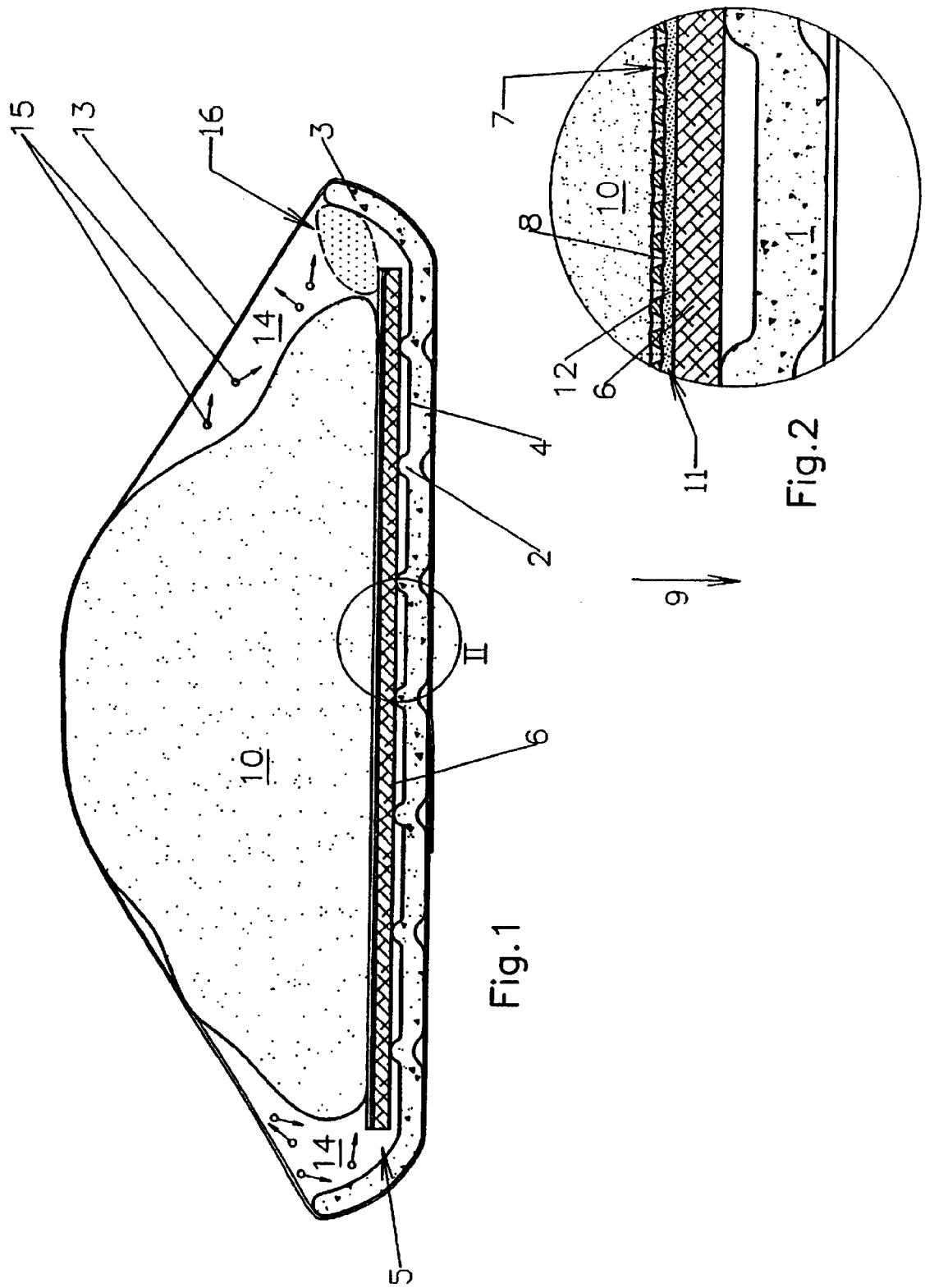

COMBINED LIQUID-TIGHT MEAT TRAY AND INSERTED ABSORBENT/SEPARATING LAYER

BACKGROUND OF THE INVENTION

1. Field of the Invention

The invention relates to a combination of a liquid-tight meat tray with inserted absorbent/separating pad.

2. Description of the Related Art

For retail packaging it is known to wrap pieces of meat placed onto a meat tray with clear plastic wrap, fresh-keeping foil or cellophane foil. Between the piece of meat and the meat tray an absorbent pad is positioned which is, for example, comprised of cellulose. The absorbent pad absorbs the liquid released by the meat. Accordingly, the meat is kept drier and the growth of bacteria is inhibited.

Since however a piece of meat generally releases liquid continuously, the inserted absorbent pad is very quickly soaked. Such a soaked pad provides a suitable growth medium for bacteria. Bacteria develop within a shortest period of time so that a piece of meat packaged in this way has a shelf life of only a few days (in general a maximum of two to three days) even when refrigerated.

The piece of meat lies within a very short period o time (already after a few hours) in its own juice and is thus exposed to the attack of bacterial from the pad.

SUMMARY OF THE INVENTION

It is an object of the present invention to provide an increased shelf life, while leaving the storage conditions unchanged, for a packaged piece of meat and to inhibit bacteria growth effectively in all respects without having to expose the piece of meat to potentially harmful substances.

This object is solved by a combination of a liquid-tight meat tray and an absorbent/separating layer inserted into the meat tray, comprised of an absorbent pad and a film arranged thereon for reducing the permeability of meat juice, which is released by gravity from a piece of meat placed onto the absorbent/separating layer, wherein the meat tray, the absorbent/separating layer, and the piece of meat are to be wrapped with a fresh-keeping foil for a common closed envelope, comprising a zone introduced into the space to be enclosed within the fresh-keeping foil with purely plant-based preservative of spice, whose microbially active volatile components are employed in a chemically unchanged form.

With the invention, the shelf life of a packaged piece of meat, in particular, pieces of fresh meat, is drastically increased. The invention resides in a combination effect of a directed, irreversible or substantially complete separation of the fresh meat from its meat juice with the generation of a microbial aura of the essential oils of the respectively used plant-based preservative(s). The invention uses for this purpose purely plant-based preservative. It has been found that certain plant-based preservatives have a strong microbial action even without this necessitating direct contact between the preservative and the meat/meat juice. Important in this context is the direct use of plant-based preservatives while avoiding a preceding distillation of the respective flavor constituents. The concentration(s) of the employed plant-based preservative (s) is/are under the regulatory declaration limit.

On the other hand, the extended shelf life is based on the separation according to the invention between the piece of meat and the juice released by the piece of meat. This separation is realized by the separating function of the absorbent/separating layer. This separation is a achieved in that the liquid flows, as a result of the storage of the piece of meat resting on the meat tray, in the direction toward the pad which is comprised of the absorbent/separating layer. Thus, the liquid penetrates the film—whose permeability in the opposite direction is bad to zero—so that the collected liquid has a tendency to remain at the bottom of the packaging, retained by the film. The film can be, for example, greaseproof paper or another material which is not very permeable for the meat juice (water). It is also possible to employ perforated film material that, outside of the perforation locations, is impermeable.

Underneath the film an absorbent pad is provided which can be comprised of cellulose/pulp fibers or an absorbent nonwoven. The absorbent pad absorbs a large portion of the liquid released by the piece of meat. For this purpose, the absorbent pad is positioned underneath the film. Accordingly, the liquid is retained within the absorbent pad; this effect is moreover enhanced when the film has a permeability that is worse in the direction toward the piece of meat than in the opposite direction.

The directional dependency of the permeability can be achieved, for example, via special perforations of the film. This will be explained later on. However, as an alternative or as a supplement, it is also Possible to coat the meat side of the perforated film to be hydrophilic and to coat the underside to be hydrophobic or to use a corresponding film packet with a permeable hydrophilic top film and a permeable hydrophobic bottom film.

The inventive effect resides also in the double function of the packaging: the meat hardly comes into contact with the liquid; on the other hand, the liquid is preserved by the zone containing the plant-based preservative, i.e., the growth of bacteria is prevented microbially. This results in a combination effect which imparts to the piece of meat overall a substantially extended shelf life.

The preservative can be enclosed in a bag with permeable and/or absorbent wall. Such a bag can be separately manufactured (for example, like a tea bag) and can be inserted into the packaging. The preservative however can also be introduced between film and pad.

By arranging the plant-based preservative between the film and the absorbent pad, the preservative is then penetrated by the liquid released from the piece of meat. Accordingly, already by the release and downward flow of the liquid, the microbially active components of the plant-based preservative are washed out and are entrained into the absorbent pad, respectively to the bottom of the meat tray. This ensures at all times a certain minimum concentration of the active components of the preservative in the liquid at the bottom of the meat tray. Accordingly, the composition and quantity of the preservative, taking into account the resulting minimum concentration and the concentration gradient, can be adjusted such that a sufficient preservative action is provided at al times from the beginning.

The absorbent pad can also be in direct contact with the zone containing the plant-based preservatives. This ensures a constant exchange between the liquid and the preservative. This provides an improved shelf life in comparison to conventional packaging, even when the absorbent pad is completely soaked; the shelf life is further increased in that more of the active ingredients are extracted from the preservative in the case of complete soaking.

The effectiveness of the preservative depends o the surface area; this holds true, on the one hand, for the total surface area of the preservative itself, in particular, as a function of the size of the surface area per quantity unit of the preservative. This is a material constant of the employed preservative; it depends on the fineness, the grain size, the roughness, and the shape of the preservative which is generally a solid material. This will be discussed later on.

On the other hand, the surface area is increased in that the plant-based preservative is distributed over the entire surface area between the film and the absorbent pad.

It is preferred that the zone containing the preservative extends over the entire large surface areas, facing one another, of the film and of he absorbent pad. Accordingly, practically the entire bottom of the meat tray is lined by means of the film, the preservative, and the absorbent pad.

The preservative is preferably positioned only between the film and the pad and underneath the piece of meat. The other locations then do not contain any preservative. The meat itself thus does not, or practically not, come into contact with the preservative.

The purely plant-based preservative can be easily introduced into the market and easily sold because such preservatives—in contrast to chemical-synthetic preservatives—are considered completely harmless and, therefore, reservations on the part of the consumer are not to be expected. The employed preservative s are preferably used in concentrations that need not be declared.

The plant-based preservatives contain microbially active volatile components. This provides a third effect of the preservation: the volatile components fill hollow spaces possibly contained in the packaging and thus act also as preservatives on the exposed surface portions of the piece of fresh meat.

Moreover, the volatile components penetrate into he piece of meat and can thus also be active within the piece of meat, i.e., under its surface.

However, as a result of the introduced absorbent/separating pad, the fresh meat will still not absorb, or absorb only to a limited extent, possibly present flavorings of the introduced preservatives. The meat does not lie within its own juice which is possibly in contact with the preservative. On the other hand, the volatile components are present in relatively minimal concentrations in the hollow spaces so that it is not to be expected that the volatile components will negatively affect the taste. Moreover, the volatile components are not necessarily flavor carriers.

The plant-based preservatives can be spices and/or herbs (in the following the term spices is meant to include both); primarily, dried herbs and dried spices are suitable. However, fresh spices can also be used. Spices are plant-based materials which are used without being chemically changed. They are completely harmless with respect to health. In spite of this, they exhibit strong microbial preserving action.

Spices are available today in large quantities and inexpensively so that a combination of spices according to the invention can be inexpensively produced/is available on a commercial scale anywhere.

Moreover, consumers do not have reservation or prejudice in regard to spices.

The microbially active components are partially volatile, as, for example, the essential oils which are generally contained in e spices. These essential oils or volatile components of spices are then always resent in the hollow spaces of the packaging and effect practically an all around preservation even at locations where no spice is positioned.

Despite of this, with the absorbent/separating p according to the invention no or only a minimal and inconsequential taste impairment of the piece of meat results. However, such an effect on the taste could also be desired. If this is so, it is suggested to select the employed spices according to the main use of the packaged piece of meat.

As a result of its large surface area per quantity unit, crushed spices, so-called ground spices, are particularly effective. This provides a greater interaction between the spices and the environment because the interaction always takes place via the surface of the spices.

For example, the crushed spice is to be placed between the film and the absorbent pad, preferably such that the entire pad is covered with the spice but such that the spice touches nowhere, or only with very small contact areas, the piece of meat. Accordingly, the entire spice can be arranged underneath the film. This limits or avoids a negative effect on the taste of the pie of meat.

The employed spices are selected from organo, allspice, onions, garlic, thyme, cinnamon, tarragon, cumin, cloves, bay leaf, chili, rosemary, marjoram, mustard seed, caraway, mint, sage, fennel, coriander, nutmeg, dill, parsley, basil, pepper, ginger, anise. It was found that the aforementioned spices all have a strong microbial action. Of course, other spices, which are not listed here and possibly have not been examined yet, can also be used.

Preferably, a mixture of different spices of the aforementioned spices is used. Moreover, the different spices can be used in different or in the same proportions.

This results in a double advantage: on the on hand, a microbial action/active dosage can be adjusted for a particular application. On the other hand, the flavor can be adjusted. The goal in this connection is to provide a flavoring effect of the employed spice mixture that is as neutral as possible. Accordingly, taste-related effects of the spice mixture on the piece of meat an be substantially prevented.

In order to achieve a neutral flavor of the employed spice/spice mixture, it is, for example, possible to employ of each spice only such an amount that each spice by itself cannot be tasted or can be tasted only minimally. It is supposed that a spice mixture, whose individual spices do not surpass the respective sensory limit concentrations in the respective application, is also neutral with respect to taste in its application. This holds true also when the total concentration of spices surpasses some or all sensory limit concentration of the employed spices.

It is presupposed that the aforementioned spices decrease in their microbial effectiveness in the above-mentioned sequence. It is therefore suggested that the proportion of the respective spice in the spice mixture is increased in the sequence oregano, allspice, onions, garlic, thyme, cinnamon, tarragon, cumin, cloves, bay leaf, chili, rosemary, marjoram, mustard seed, caraway, mint, sage, fennel, coriander, nutmeg, dill, parsley, basil, pepper, ginger, anise. Since the effect of the first mentioned spices is especially strong, it is therefore only necessary to use small amounts thereof. This has the advantage that also the side effects (for example, taste) of the aforementioned spices or herbs are reduced.

In order to achieve an increased permeability of the film, which can be made of parchment material, plastic material or aluminium, in the direction from the piece of meat to the pad, it is suggested to perforate the film and to have the cross-sections of the perforated holes decrease in the direction toward the pad. The film is preferably perforated over its entire surface area. The perforations are arranged at a comparatively small spacing, which is, for example, a few tenths of a millimeter to a few millimeters. In order to take advantage of the capillary effect, the cross-section of the perforation holes is comparatively small; it is within the range of one millimeter down to a tent of a millimeter or less. As a result of the converging shape of the perforation holes in the direction toward the pad, a suction effect is achieved in the direction toward the pad. The capillary action of the film which is wetted by the meat juice increases—as a result of gravity—in the direction toward the pad. This results in the aforementioned suction effect. In the reverse direction, however, a reduced permeability is provided—as a result of the capillary effect and gravity.

BRIEF DESCRIPTION OF THE DRAWINGS

The invention will be explained in more detail with the aid of embodiments illustrated in the Figures. It is shown in:

FIG. 1 a section of a meat tray according to the invention with an absorbent/separating pad and piece of meat placed thereon;

FIG. 2 a detail view as indicated by the circle in FIG. 1.

DESCRIPTION OF PREFERRED EMBODIMENTS

If not stated otherwise, all reference numerals a always refer to all Figures.

FIG. 1 shows a combination inter alia of a liquid-tight meat tray 1. The meat tray 1 can be comprised, for example, of foamed plastic material. All employed materials are, of course, suitable for use with food, preferably they are completely harmless health-wise. This holds true also for the plant-based preservatives. As a result of the inner grooves 4, which are formed by parallel extending inner stays 2, a certain storage space for the liquids released from the meat is provided. Moreover, the tray rim 3 is angled toward the meat (in the upward direction) so that the meat tray overall as a trough shape. Accordingly, when horizontally positioned, as illustrated, no liquid can flow out laterally along the sides.

A piece of fresh meat 10 is placed onto the meat tray 1. The piece of fresh meat 10 together with the meat tray 1 is wrapped and enclosed in fresh-keeping foil 13.

An absorbent/separating layer 5 is inserted between the piece of meat 10 and the underside (the inner bottom) of the meat tray 1 This absorbent/separating pad 5 is comprised of an absorbent pad 6. The absorbent pad 6 can be comprised of any absorbent material which is harmless health-wise. Pulp fibers or cellulose and the like are suitable.

The introduced zone 11 of preservative 12 can be in the form of a separately introduced bag 16 (indicated in a dashed line in the drawing) with air-permeable wall and the preservative 12 can be enclosed in the bag.

Alternatively or cumulatively the following holds true:

A film 7 is positioned on the absorbent pad 6. This film has a permeability which is better in the direction 9 toward the pad 6 than in the opposite direction. This will be explained in more detail later on.

Between the film 7 and the absorbent pad 6, which extends practically over the entire lower contact surface of the piece of meat 10 on the meat tray 1, a zone 11 (here also a layer covering the entire surface area which extends over the entire surface area of the absorbent pad 6 and the film 7) of a purely plant-based preservatives is provided.

This preservatives are spices 12 in a chemical unchanged form which contain essential oils as important high-volatile components 15.

As shown here, the liquid released from the pie of meat 10 penetrates first the film 7, impregnates then the zone 11 with preservative 12, and reaches only then the absorbent pad 6 where the liquid is absorbed Accordingly, from the beginning the zone 11 wit the preservative 12 is always soaked, i.e., the liquid released from the piece meat 10 penetrates it. At the same time, the zone 11 is a buffer between the absorbent pad 6 and the film 7, respectively, the piece of meat 10. Any liquid exchange between these areas must take place via the zone 11.

Accordingly, an optimal preservation effect is provided. Even when at times some liquid will rise from the bottom of the meat tray, it must first pass the zone 11 before reaching the piece of meat 10. In the zone 11 germs, which might have formed already, will be neutralized in any case.

The zone 11 thus provides a preservative barrier between the piece of meat 10 and the already released liquid which has collected on t e bottom and which has been absorbed by the absorbent pad 6. Moreover, the volatile components 15 are illustrated schematically in the hollow space 14. They are practically sealed in as a result of the almost complete air seal which is provided by the fresh-keeping foil 13. Accordingly, they can act onto the surface of the piece of meat 10 not contacting the meat tray 1. The piece of meat 10 is then practically preserved on all sides (with the exception of the small contact zone between the fresh-keeping foil 13 and the surface of the piece of meat 10 at the upper side).

The spices 12 are preferably ground spices. Ground spices can be arranged in the shown way over the entire surface area between the piece of meat 10 and the bottom of the meat tray 1. Also conceivable a e, however, pieces of spices, or leaves which are arranged in the illustrated way important is in this embodiment a layer of spice 12 practically across the entire surface area.

FIG. 2 shows a detail of FIG. 1 indicated in FIG. 1 by a circle.

The fine structure of the absorbent/separating layer 5 is illustrated here. The film 7 is comprised of a film material in which the shown perforation holes 8 are introduced. The perforation holes 8 have a funnel-shaped cross-section. The cross-section narrows in a direction away from he piece of meat 10 toward the zone 11. Accordingly, the upwardly positioned inlet openings are larger than the downwardly positioned exit openings. As a result of the different opening cross-sections, the different permeabilities according to the invention are already provided.

The perforation holes can be, for example, introduced or rolled by a punching tool (for example, a rolling tool) with shaping tips with correspondingly cone-shaped or truncated cone-shaped cross-section into the film 7. When doing so, the tool with the shaping tips is positioned so as to face the future upper surface (meat side). Accordingly, at the meat side a smooth permeable surface will result. At the underside a relatively rough surface will be formed because the opening holes are formed or pushed out in this direction.

The perforation holes are so small and so finely distributed that the film 7 ensures in the end a practically homogenous permeability over its entire surface area.

The film 7 is a thin (a few tenths of a millimeter), if needed, also a multi-layer film of a material suitable for food, for example, a plastic material, in particular, a polyethylene film or polypropylene film.

List of Reference Numerals:

1 meat tray
2 inner stay

3 tray rim
4 inner groove
5 absorbent/separating layer
6 absorbent pad
7 film
8 perforation hole
9 direction toward pad
10 piece of meat
11 zone with preservative
12 spice
13 fresh-keeping foil
14 hollow space
15 essential, high-volatile components
16 bag

What is claimed is:

1. A combination of a liquid-tight meat tray (1) and an absorbent/separating layer (5) inserted into the meat tray, wherein the absorbent/separating layer (5) is comprised of an absorbent pad (6) and a film (7), arranged on the absorbent pad (6) and configured to reduce the permeability of meat juice released by gravity from a piece of meat placed onto the absorbent/separating layer (5), wherein the meat tray (1), the absorbent/separating layer (5), and the piece of meat placed on the absorbent/separating layer (5) are to be wrapped by a fresh-keeping foil (13) such that a common closed envelope is formed of the fresh-keeping foil (13), the combination further comprising a zone (11) introduced into a space to be enclosed by the fresh-keeping foil (13), wherein the zone (11) contains a purely plant-based preservative (12) comprised of crushed spice material having microbially active volatile components (15) employed in a chemically unchanged form, wherein the microbially active volatile components (15) form an aura within the space to be enclosed by the fresh-keeping foil (13) without the crushed spice material and the piece of meat (10) having direct contact with one another.

2. The combination according to claim 1, wherein the zone (11) is introduced into the absorbent/separating layer (5).

3. The combination according to claim 1, wherein the zone (11) is comprised of a bag (16) with an air-permeable wall, wherein the plant-based preservative (12) is enclosed in the bag (16).

4. The combination according to claim 1, wherein the crushed spice material is a mixture of several spices.

5. The combination according to claim 1, wherein the crushed spice material is a mixture of several herbs.

6. The combination according to claim 1, wherein the crushed spice material is a mixture of several spices and herbs.

7. The combination according to 1, wherein the crushed spice material contains one or more spices selected from the group consisting of organo, allspice, onions, garlic, thyme, cinnamon, tarragon, cumin, cloves, bay leaf, chili, rosemary, marjoram, mustard seed, caraway, mint, sage, fennel, coriander, nutmeg, dill, parsley, basil, pepper, ginger, and anise.

8. The combination according to claim 7, wherein the proportion of the spices selected from the group in the crushed spice material increases in the sequence organo, allspice, onions, garlic, thyme, cinnamon, tarragon, cumin, cloves, bay leaf, chili, rosemary, marjoram, mustard seed, caraway, mint, sage fennel, coriander, nutmeg, dill, parsley, basil, pepper, ginger, and anise.

9. The combination according to claim 1, wherein the film (7) is perforated to form perforation holes (8) and wherein a cross-section of the perforation holes (8) decrease in a direction (9) toward the absorbent pad (6).

10. The combination according to claim 9, wherein the film (7) has a permeability that is better in the direction (9) toward the absorbent pad (6) than in the opposite direction.

11. The combination according to claim 1, wherein the film (7) is comprised of greaseproof paper.

12. The combination according to claim 1, wherein the film (7) is comprised of plastic material.

13. The combination according to claim 1, wherein the film (7) is comprised of aluminum.

14. The combination according to claim 1, wherein the plant-based preservative (12) is used in a concentration below regulatory declaration limits.

* * * * *